United States Patent [19]

Enders

[11] 4,144,114
[45] Mar. 13, 1979

[54] TIRE BUILDING MACHINE

[75] Inventor: George E. Enders, Salem, Ohio

[73] Assignee: NRM Corporation, Akron, Ohio

[21] Appl. No.: 814,196

[22] Filed: Jul. 11, 1977

[51] Int. Cl.² .......................................... B29H 17/26
[52] U.S. Cl. .................................. 156/414; 156/416
[58] Field of Search ............... 156/123, 128, 133, 394, 156/414, 415, 416, 417, 418, 419, 420, 398–403, 131, 132

[56] References Cited

U.S. PATENT DOCUMENTS

| | | | |
|---|---|---|---|
| 2,814,330 | 11/1957 | Vanzo et al. | 156/403 X |
| 3,035,629 | 5/1962 | Vanzo et al. | 156/416 |
| 3,138,510 | 6/1964 | Hindin et al. | 156/128 |
| 3,235,435 | 2/1966 | Pouilloux | 156/416 |
| 3,493,454 | 2/1970 | Cooper et al. | 156/416 |
| 3,518,149 | 6/1970 | Mirtain | 156/416 |
| 3,580,782 | 5/1971 | Leblond | 156/415 |
| 3,909,337 | 9/1975 | Yabe | 156/416 |
| 3,922,187 | 11/1975 | De Nardis | 156/415 |
| 4,010,058 | 3/1977 | Kubinski et al. | 156/420 |

Primary Examiner—John E. Kittle
Attorney, Agent, or Firm—Maky, Renner, Otto & Boisselle

[57] ABSTRACT

A tire building machine of the second-stage type includes a housing with a main shaft journaled in and projecting from the housing in cantilever fashion. Distal and proximal flanges are mounted on the shaft for axial movement toward and away from each other and for rotation with the shaft, each flange being supported on the shaft by an elongated sliding sleeve, the distal flange being secured to its sleeve by a readily removable nose piece supporting the flange axially offset from the distal end of its sleeve, the sleeve for the distal flange being slidably supported by an elongated bushing at its proximal end only while the sleeve for the proximal flange is slidably supported by bushings at each end, one riding on the shaft while the other rides on the sleeve for the distal flange. Each sleeve is driven for axial movement from its inner end by a screw shaft journaled in the main shaft and having identical but opposite hand threaded sections both in the cantilevered portion of the shaft and outside the housing. The simplified construction permits both flanges readily to be removed and replaced by flanges of a different size. The construction of the shaft and flange supporting sleeves is such that no outboard support is required for the shaft with deflection and run-out being minimized.

30 Claims, 4 Drawing Figures

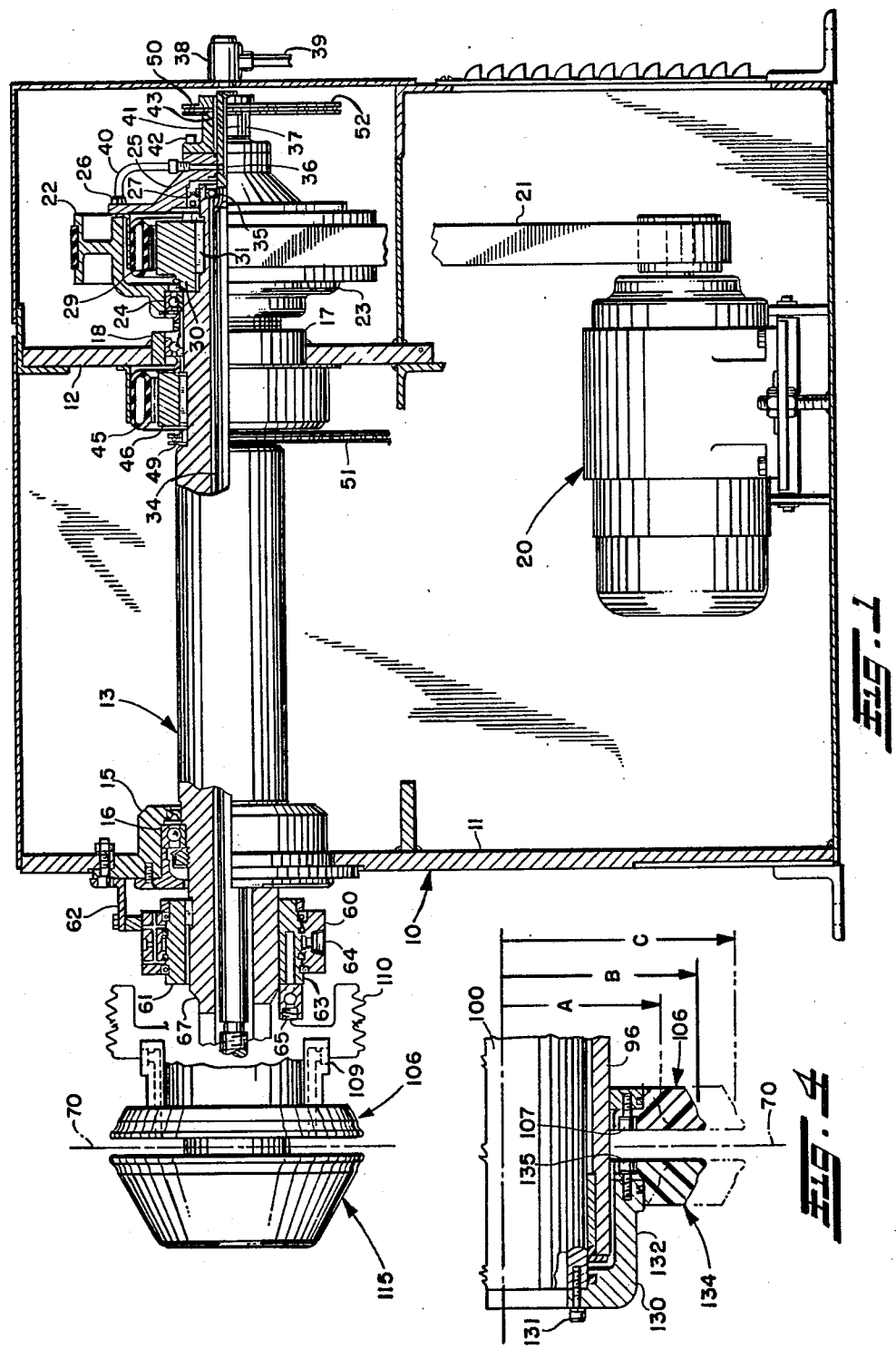

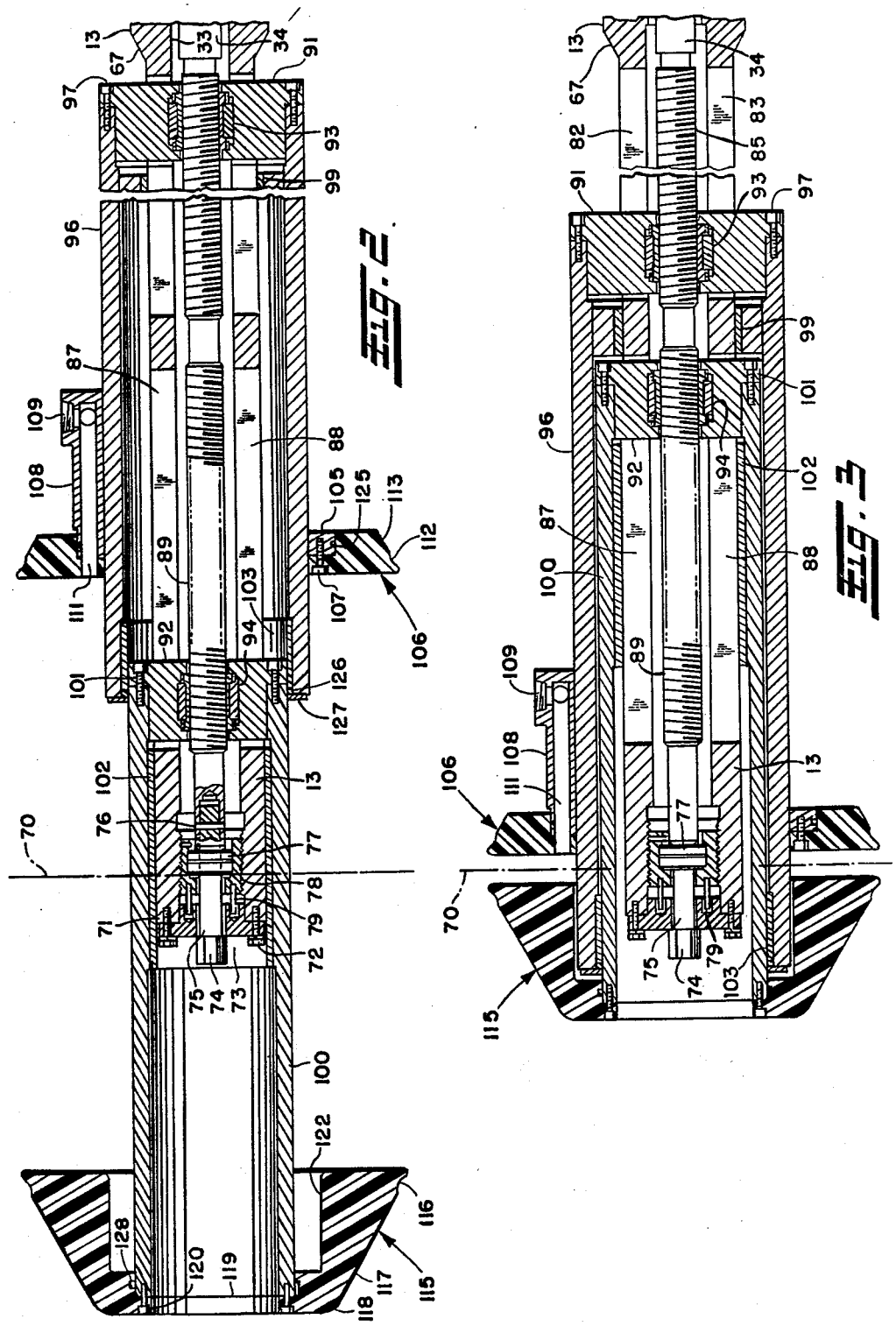

TIRE BUILDING MACHINE

BACKGROUND AND SUMMARY OF THE INVENTION

This invention relates generally as indicated to a tire building machine and more particularly to a second-stage tire building machine wherein the generally cylindrical first stage tire carcass is inflated and shaped to a specified toroidal shape for application of tire components thereto such as a belt and tread assembly.

Although second stage direct inflation shaping machines have heretofore been employed, such machines are usually rather complex and do not have the ability to shape a wide variety of tire sizes. For example, if tires with different bead diameters or shapes are to be employed on the machine, the bead-engaging flanges must be replaced by bead-engaging flanges of a different shape or diameter. This is not easily accomplished on tire shaping machines resulting in substantial down-time for conversion from one tire to another. Moreover, many such machines may not have sufficient maximum shoulder set and accordingly for larger tires, different machines must be employed.

In contrast, the present machine permits substantially all passenger size tires or carcasses to be shaped and completed. The machine of the present invention will handle tires with bead diameters as small as 10 inches (254.0 mm) and as large as 16.5 inches (419.0 mm) in bead diameter. The maximum shoulder set is approximately 22 inches (558.8 mm). The machine may therefore accommodate tire sizes ranging from some motorbike tires to light truck or large balloon tires for dune buggies, for example. The versatility of the machine is in part accomplished by its ability to accommodate flanges of different diameters quickly requiring very little down-time for conversion.

In addition to such versatility, the machine shaft and sleeve arrangement supporting the bead engaging flanges requires no outboard support with minimum of deflection or run-out, thus permitting tires to be built thereon to a high degree of accuracy. Moreover, the simplicity of the machine reduces its cost and the clean cantilever arrangement of the shaft, sleeves, and drives for such sleeves permits ease of maintenance and optimum space usage, the latter permitting the machine to be used in conjunction with a wide variety of auxiliary equipment such as transfers, servicers, and stitchers to provide a highly efficient tire building system.

It is therefore a principal object of the present invention to provide a second stage tire building machine which can readily accommodate substantially all passenger size tires.

Another principal object is the provision of such machine wherein the bead engaging flanges are mounted on a cantilevered shaft, which includes no external transmissions or other mechanisms which would interfere with equipment used in conjunction therewith.

Still another important object is the provision of a highly simplified second stage tire building machine in which unacceptable deflection and run-out are avoided in spite of the significant cantilever of the shaft.

Another object is the provision of a second stage tire building machine wherein the flanges on the cantilevered shaft are driven for axial movement by a drive screw inside the shaft, the drive connections thereto being entirely on the cantilevered portion of the shaft.

A further object is the provision of a support for the distal flange on the shaft which includes a clearance accommodating the sleeve supporting the proximal flange.

Yet another object is the provision of such tire building machine wherein the distal and proximal flanges are supported on elongated sliding sleeves with the sleeve for the distal flange being supported on the shaft at its proximal end only for telescoping on and beyond the distal end of the shaft.

Another object is the provision of such machine wherein the distal flange is secured to its supporting sleeve by a readily removable nose piece not only supporting the distal flange axially offset from the distal end of its sleeve, but providing a pilot guide for assisting the operator in placing the first stage tire on the machine.

A still further object is the provision of such machine utilizing bead engaging flanges machined from plastic material, such flanges including pilot surfaces which assist in centering the first stage tire beads with respect thereto.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a front elevation of the machine partially broken away and in section illustrating the support and drives for the main shaft in the housing;

FIG. 2 is a transverse section on a somewhat reduced scale, again broken away, illustrating the cantilevered portion of the shaft with the sleeves and flanges thereon in a position of maximum shoulder set;

FIG. 3 is a view similar to FIG. 2 illustrating the flanges in their position of minimum shoulder set; and FIG. 4 is a fragmentary section illustrating another form of nose piece and flanges which may be employed with the present invention.

DESCRIPTION OF THE PREFERRED EMBODIMENTS

Referring now to the annexed drawings and first to FIG. 1 it will be seen that the machine includes a housing shown generally at 10 which includes two horizontally spaced vertical main support walls 11 and 12, between which the main shaft assembly 13 is journaled for rotation.

The front wall 11 is provided with an opening in which is secured bearing housing 15 supporting externally main bearing 16 for shaft assembly 13. Similarly the wall 12 is provided with an opening in which is secured ring 17 externally supporting bearing 18 for main shaft assembly 13.

Rotation of the main shaft assembly is obtained by motor 20 driving belt 21 which is trained about two-part pulley 22. One part of the pulley constitutes a housing as seen at 23 journaled on the main shaft assembly by the bearing 24. The other part of the pulley indicated at 25 is secured to the housing 23 by fasteners 26, and it too is journaled on the end of the main shaft assembly by the bearing indicated at 27. The two parts of the pulley 23 and 25 constitute a housing for pneumatic clutch assembly indicated at 29, which selectively provides driving engagement between the pulley and clutch wheel 30 keyed to the main shaft assembly 13 as indicated at 31.

The main shaft assembly 13 is hollow as seen at 33 and journaled in such main shaft assembly is a screw shaft 34. The inner or proximal end of the screw shaft is journaled in the main shaft by bearing 35 riding against the reduced diameter end portion of the screw shaft. Such reduced diameter end of the screw shaft extends closely adjacent and through hole 36 in the pulley housing member 25. The reduced diameter end portion of the screw is provided with a center air passage 37 and radial passages are provided in the screw and in the reduced diameter portion of the pulley housing support 25. Seals may be provided on either side of such passages at the interface between the housing and the screw shaft. A rotary union 38 is operatively connected to the end of the screw shaft so that air to the clutch assembly 29 may be supplied from line 39 through the passages illustrated and through the conduit 40 to the clutch assembly 29. A retainer 41 is secured to the pulley housing support 25 by fasteners 42, such retainer in turn being keyed to the screw shaft 34 as indicated at 43. Thus the pulley 22 is keyed for rotation with the screw shaft 34 but journaled for rotation with respect to the main shaft assembly 13. When the clutch 29 is engaged, both the screw shaft and the main shaft assembly will rotate together.

Another brake assembly, which may be identical to the clutch assembly 29, is employed at 45 and is secured to the wall 12. The brake assembly is operative in conjunction with brake wheel 46 keyed to the main shaft assembly 13 as seen at 47.

When it is desired to rotate the screw shaft 34 only, the brake 45 will be engaged as a brake holding the main shaft assembly 13 against rotation. At the same time, the clutch assembly 29 will be disengaged with the pulley driving only the screw shaft 34. To rotate the main shaft, the brake assembly 45 is disengaged and the clutch 29 is engaged. In such condition both the main shaft and screw shaft will rotate in unison.

The main shaft assembly has keyed thereto a sprocket 49 while sprocket 50 is secured to retainer 41 which is in turn keyed to the screw shaft 34. Chain drives 51 and 52, connected to such sprockets, respectively, are in turn connected to a differential sensor, not shown. The differential sensor continuously senses the rotational positions of both the main shaft assembly and the screw shaft, thus sensing the position of the flanges, hereinafter described, at all times both linearly and rotatively.

This permits the machine to be programmed both with respect to the rotation of the tire as well as the shoulder set and shaping speeds.

Between the journals the main shaft assembly within the housing is of substantial diameter. For example, the shaft may have an O.D. of approximately 6 inches (152.4 mm) between the journals. The shaft is reduced somewhat as it passes through the bearing housing 15 on the wall 11 and adjacent such wall is provided with an air header 60 journaled on rotary seal 61 keyed for rotation with the shaft 13. The header or manifold is secured against rotation by the air header bracket 62 secured to the bearing housing 15. The air header is provided with an annular internal groove which communicates with axial passage 63 in the seal so that air may pass from the stationary fitting 64 to the fitting 65 rotating with the shaft.

Beyond the air header the shaft 13 reduces in diameter somewhat further as indicated at 67 and extends therebeyond in cantilever fashion from housing 10. The cantilevered portion of the shaft, shown broken away in FIG. 1, is illustrated in greater detail in FIGS. 2 and 3 on a somewhat reduced scale. However, it should be appreciated that even FIGS. 2 and 3 are shown broken away so that the cantilevered portion of the shaft is even longer than actually illustrated. For example, the centerline of the drum or shaper indicated at 70 in FIG. 2 is approximately 42 inches (1066.8 mm) from the face of the wall 11 while the wall 12 seen in FIG. 1 is approximately 30 inches (762.0 mm) from the face of wall 11. As seen in FIG. 2, the shaft extends somewhat beyond the centerline of the drum or shaper and in this manner the cantilevered distal end of the shaft is significantly longer than the supported non-cantilevered or proximal end of the shaft.

As seen in FIG. 2, from the reduction in diameter as indicated at 67, the main shaft 13 is then of a consistent O.D. to its end indicated at 71. The end of the shaft is slightly more than an inch and a half (38.1 mm) beyond the centerline 70. Secured to the end of the shaft by the fasteners seen at 72 is an end piece 73 through which projects the hex head end 74 of screw shaft extension 75. The extension may be pin-connected to the screw shaft as seen at 76.

The end of the screw shaft is supported in side by side journals seen at 77 which in turn are supported in bearing housing 78, the O.D. of which is threaded to the I.D. of the shaft 13. Dowel pins seen at 79 interconnect the bearing housing 78 and the end piece 73. The dowel pins keep the bearing housing from rotating once set-up adjustment has been made. The screw shaft 34 is designed to float axially one thread pitch lead for installation alignment purposes. Such alignment may be accomplished by removing the fasteners 72 and rotating the end piece which in turn rotates the bearing housing which in turn axially moves the screw shaft. There are sufficient circumferentially spaced fasteners 72 and blind holes in the shaft end to permit incremental adjustment of the end piece 73 to obtain the desired adjustment of the bearing housing 78. Such adjustment permits the flanges hereinafter described to be precisely centered symmetrically with respect to the centerline 70 of the machine.

Adjacent the reduced diameter portion 67 of the main shaft 13, such shaft is provided with two diametrically opposed elongated slots 82 and 83. The screw shaft 34 is provided with a threaded section 85 slightly longer than such slots but coextensive therewith. A second pair of slots of the same length is provided in the main shaft as seen at 87 and 88 and again a coextensive threaded section is provided on the screw shaft 34 as seen at 89. The threaded sections 85 and 89 are, as indicated, identical but of opposite hand.

A diametral key sliding 91 extends closely through the slots 82 and 83 while a somewhat shorter key 92 extends through the slots 87 and 88. Each key is in driving engagement with the respective threaded sections of the screw by the nut and sleeve assemblies seen at 93 and 94, respectively, again each such assembly being of the appropriate opposite hand. The nut and sleeve assembly 93 is split to facilitate removal.

The key 91 at its radial outer ends is provided with shoulders which receive the proximal end of elongated proximal sleeve 96. The sleeve is secured to the key by the fasteners seen at 97. The elongated sleeve 96 is also provided with an interior ring 98 adjacent the key 91, such ring being provided on its interior with a sliding bearing 99 which rides on the O.D. of the cantilevered portion of the main shaft assembly 13.

It should be noted that for convenience of reference the flanges and sleeves hereinafter described will be termed proximal and distal, respectively, the distal parts being those on the outer end of the shaft while the proximal parts are those closest to the housing or point of support or connection of the shaft to such housing.

The key 92 is likewise shouldered at its outer ends and supports the proximal end of elongated distal sleeve 100 which is secured thereto by fasteners 101. The distal sleeve 100 is supported on the O.D. of the shaft 13 by an elongated sliding bearing 102 which extends from adjacent the key 92 to the approximate mid-point of such sleeve. The sleeve 100 is otherwise unsupported and telescopes in this manner directly on the shaft 13. The proximal sleeve 96 is supported at its distal end by sliding bearing 103 which rides on the O.D. of the distal sleeve 100. Thus the proximal sleeve 96 is supported for sliding movement at both ends, at its inner or proximal end by the sleeve bearing 99 riding directly on the shaft 13 and at its distal or outer end by the sleeve bearing 103 riding directly on the O.D. of the sleeve 100. In contrast, the distal sleeve 100 is supported by a single elongated sliding bearing 102 at its proximal end only. The distal sleeve 100 thus telescopes directly on the shaft while the proximal sleeve 96 telescopes at its proximal end directly on the shaft and at its distal end on the sleeve 100.

Secured to the sleeve 96 is a ring 105 to which proximal tire bead engaging flange 106 is secured by fasteners 107. The ring 105 includes one or more axial extensions 108 provided with radially extending fittings 109 to which flexible and extensible hose connections 110 may be secured, such hose connections being connected to the fitting 65 seen in FIG. 1. The flange 106 includes a hole 111 so that inflation air may be supplied to the interior of the tire. The proximal flange 106 includes a rounded outside bead seat as seen at 112 and a pilot portion 113 contiguous thereto for the purpose of assisting the operator in placing the bead on the seat or shoulder 112.

The distal flange 115 similarly includes the rounded outside shoulder as well as a more extensive conical pilot surface 117 forming a nose 118 for the end of the sleeve 100. The distal flange includes an internal shoulder 119 fitting over the end of the sleeve 100 and is secured to such sleeve by fasteners 120. The I.D. of the flange 115 is also provided with a shouldered elongated recess 122 which accommodates the distal end of the proximal sleeve 96 when the flanges and sleeves are in the closed position as seen in FIG. 3.

In operation the machine will initially be in the position shown in FIG. 3. The operator will then buttonhook the bead of one end of a first stage tire over the flanges and hold the bead against the rounded outside shoulder bead seat 112. The pilot surface 113 assists in this regard. Upon automatic cycle, the flanges then move apart to the desired shoulder set with the nose of the other flange moving through the opposite bead seating and centering the opposite bead ring on the outside shoulder 116. Inflation air is provided to the chamber provided by the flanges, the tire, and the telescoped sleeves 100 and 96. To insure the integrity of the air chamber only three internal air seals need be provided, one at 125 between the proximal flange 106 and the ring 105, one between the sleeves seen at 126 held in place by retainer 127, and one at 128 between the distal flange and the O.D. of the sleeve 100. As the tire is inflated, the flanges move uniformly toward each other to bring the tire to the desired toroidal shape. After the additional components are placed on the tire and stitched in place, the tire is deflated and the flanges are brought to the FIG. 3 position, the tire is then either manually or automatically removed from the machine.

In the embodiment of FIGS. 2 and 3 the flanges are illustrated as plastic. A preferred plastic is Nylon, but other plastics such as urethanes may be employed. The flanges may equally well be metal.

With the construction of the present machine, the centerline of the shaping flanges 70 is well within the projecting end of the main shaft. Moreover, the proximal and distal sleeves supporting the proximal and distal flanges, respectively, are well supported either directly on the main shaft assembly or on the distal sleeve and serve to reinforce not only each other, but also the shaft itself against deflection. By positioning the flanges as illustrated on the sleeves such support can be maintained while bringing the flanges essentially adjacent each other as seen in FIG. 3 to permit the tire to be placed on the flanges. This can be accomplished by the recess on the I.D. of the distal flange permitting the proximal flange to telescope therebeneath.

Referring now to FIG. 4, there is illustrated a slightly modified nose piece 130 secured to the end of the sleeve 100 by the fasteners 131. The nose piece includes a cylindrical offset portion 132 providing an internal recess for the sleeve 96. The proximal flange 106 is identical to the flange 106 seen in FIG. 2. The distal flange 134 is identical to the flange 106, and is held to the metal nose piece by the fasteners 135. In this manner each machine may be equipped with a set of pairs of identical flanges for each bead diameter required. Such flanges may readily be removed and replaced by removing the fasteners 131 to remove the nose piece and the distal flange, removing the fasteners 135, and removing the fasteners 107. The flanges may be replaced by the reverse procedure. The flange change can be accomplished in a matter of minutes. As indicated, the machine can accommodate a variety of flanges of differing bead diameters such as shown at A, B and C in FIG. 4. The A dimension may, for example, have a bead diameter of 10 inches (254.0 mm). The B diameter may be 13 inches (330.2 mm), while the C diameter is 16.5 inches (419.0 mm).

The flanges in the FIG. 2 embodiment can be changed even more easily simply by removing the fastenrs 120 and 107 and sliding the flanges axially to the left as seen in FIG. 2.

It can now be seen that there is provided a simple and economical second stage tire building machine which will accurately shape to the desired centerline and which will accommodate a full range of passenger size tires.

Other modes of applying the principle of the invention may be employed, change being made as regards the details described, provided the features stated in any of the following claims or the equivalent of such be employed.

I, therefore, particularly point out and distinctly claim as my invention:

1. A second stage tire building machine comprising a housing, a main shaft journaled in and projecting from said housing in cantilever fashion, a screw shaft journaled in said main shaft at opposite ends thereof and coextensive therewith, a distal sleeve slidably mounted on said shaft, a proximal sleeve telescoped over said distal sleeve and being slidably mounted on said distal sleeve at one end and said shaft at the other end, tire bead engaging flanges on each sleeve, said screw including opposite hand threaded sections exteriorly of said housing, axial slots in said main shaft corresponding to said threaded sections of said screw, and drive means connecting the ends of said sleeves to said threaded sections to move said sleeves and thus said flanges uniformly in opposite directions upon relative rotation of said shaft and screw.

2. A tire building machine as set forth in claim 1, wherein said distal sleeve projects beyond the end of said shaft and includes a single substantially elongated sleeve bearing at its axial inner end riding on said main shaft.

3. A tire building machine as set forth in claim 2 wherein said proximal sleeve includes relatively shorter sleeve bearings at each end, one riding on said distal sleeve and the other riding on said main shaft.

4. A tire building machine as set forth in claim 1 including a key secured to the axial inner end of each sleeve each projecting through the respective slots to connect said sleeves and threaded sections.

5. A tire building machine as set forth in claim 1 wherein the tire bead engaging flange on the distal sleeve is secured to the distal end thereof.

6. A tire building machine as set forth in claim 5 wherein the tire bead engaging flange on the proximal sleeve is secured to a position intermediate the ends thereof.

7. A tire building machine as set forth in claim 6 including a recess in the flange secured to said distal sleeve to accommodate the end of said proximal sleeve when the flanges are brought adjacent each other.

8. A tire building machine as set forth in claim 1 including an air supply ring journaled on said main shaft exteriorly of and adjacent said housing, and means to hold said ring against rotation.

9. A tire building machine as set forth in claim 1, including a manifold keyed to said main shaft exteriorly of and adjacent said housing, an air supply ring journaled on said manifold and held against rotation, and an extensible air connection between said manifold and said flange on said proximal sleeve.

10. A tire building machine as set forth in claim 1 wherein said bead engaging flanges each have a rounded bead engaging seat on their outer exterior edges, and a conical pilot surface thereadjacent.

11. A second stage tire building machine comprising a main supporting shaft, a pair of tire bead engaging flanges mounted on said shaft for axial movement toward and away from each other and for rotation with said shaft, each flange being supported on said shaft by an axially elongated sliding sleeve, one sleeve telescoping within the other, the flange on said one sleeve being supported by an offset adapter to provide a clearance between the I.D. of the flange and said one sleeve, said clearance accommodating the end of the other sleeve as said flanges approach each other.

12. A tire building machine as set forth in claim 11 wherein said adapter has a cylindrical O.D. less than the diameter of smallest flange supported thereby.

13. A tire building machine as set forth in claim 11 wherein said adapter is secured to the end of said one sleeve to provide a projecting nose piece for the flange secured thereto.

14. A tire building machine as set forth in claim 11 wherein each flange is identical, the flange on said other sleeve being readily axially removable when the adapter and the flange supported thereby is removed.

15. A tire building machine as set forth in claim 11 wherein each flange is molded plastic and includes a bead seat with a conical pilot surface thereadjacent.

16. A second stage tire building machine comprising a housing, a main supporting shaft journaled in and projecting from said housing in cantilever fashion, a distal and a proximal tire bead engaging flange mounted on the projecting end of said shaft for axial movement toward and away from each other and for rotation with said shaft, each flange being supported on said shaft by an enlogated sliding sleeve, the sleeve for the distal flange being supported on said shaft at its proximal end only and extending beyond the distal end of said shaft, the sleeve for the distal flange being slidingly supported on said shaft by an elongated sliding bearing at its proximal end only.

17. A tire building machine as set forth in claim 16 wherein said bearing extends approximately half the length of said sleeve.

18. A tire building machine as set forth in claim 16 including a screw drive for said sleeves within said shaft, and key means connecting each sleeve at the proximal ends thereof to said screw drive.

19. A tire building machine as set forth in claim 16 wherein the sleeve for the proximal flange is slidingly supported at its distal end by a relatively short sliding bearing riding on the sleeve for the distal flange.

20. A tire building machine as set forth in claim 19, wherein the sleeve for the proximal flange is slidingly supported at its proximal end by a relatively short sliding bearing riding on said shaft.

21. A tire building machine as set forth in claim 16 including an air seal between said sliding sleeves at the distal end of the sleeve for the proximal flange.

22. A second stage tire building machine comprising a housing, a main support shaft journaled in and projecting from said housing in cantilever fashion, a distal and a proximal tire bead engaging flange mounted on said shaft for axial movement toward and away from each other and for rotation with said shaft, each flange being supported on said shaft by an elongated sliding sleeve, the sleeve for the distal flange telescoping on said shaft and extending beyond the distal end of said shaft, the sleeve for the distal flange being slidingly supported on said shaft by an elongated sliding bearing at its proximal end only.

23. A tire building machine as set forth in claim 22 wherein the sleeve for the distal flange telescopes within the elongated sliding sleeve for the proximal flange.

24. A tire building machine as set forth in claim 22 wherein both sliding sleeves are mounted at all positions thereof on the cantilevered portion of said shaft.

25. A tire building machine as set forth in claim 22 wherein the distal end of the sleeve for the distal flange telescopes beyond the distal end of the shaft in all positions thereof.

26. A tire building machine as set forth in claim 25 including a nose piece secured to the distal end of the sleeve for the distal flange supporting the distal flange axially offset from the distal end of the sleeve.

27. A tire building machine as set forth in claim 26 wherein said nose piece is integrally formed with the distal flange and includes a conical pilot surface.

28. A second stage tire building machine comprising a housing, a main support shaft journaled in and projecting from said housing in cantilever fashion, a distal and a proximal tire bead engaging flange mounted on said shaft for axial movement toward and away from each other and for rotation with said shaft, each flange being supported on said shaft by an elongated sliding sleeve, the distal flange being secured to its sleeve by a readily removable nose piece supporting said flange axially offset inwardly from the distal end of its sleeve and spaced radially outwardly therefrom.

29. A tire building machine as set forth in claim 28 wherein said nose piece is formed integrally with the distal flange and includes a conical pilot surface.

30. A tire building machine as set forth in claim 28 wherein said nose piece is formed separately from said distal flange with the latter being removably secured thereto, said nose piece including a cylindrical O.D. less than the diameter of the smallest flange which can be employed with the machine.

* * * * *